(12) United States Patent  
Gomyo et al.

(10) Patent No.: US 6,890,104 B2  
(45) Date of Patent: May 10, 2005

(54) HYDRODYNAMIC BEARING DEVICE

(75) Inventors: Masato Gomyo, Nagano (JP); Masaaki Sato, Nagano (JP)

(73) Assignee: Kabushi Kaisha Sankyo Seiki Seisakusho, Nagano (JP)

( * ) Notice: Subject to any disclaimer, the term of this patent is extended or adjusted under 35 U.S.C. 154(b) by 67 days.

(21) Appl. No.: 10/332,005

(22) PCT Filed: Jul. 10, 2001

(86) PCT No.: PCT/JP01/05979

§ 371 (c)(1),  
(2), (4) Date: Jan. 2, 2003

(87) PCT Pub. No.: WO02/04825

PCT Pub. Date: Jan. 17, 2002

(65) Prior Publication Data

US 2003/0185473 A1 Oct. 2, 2003

(30) Foreign Application Priority Data

Jul. 10, 2000 (JP) ........................ 2000-207952

(51) Int. Cl.⁷ .............................................. F16C 32/06
(52) U.S. Cl. ........................ 384/119; 384/107; 384/132
(58) Field of Search ................................ 384/100, 107, 384/114, 119, 132

(56) References Cited

U.S. PATENT DOCUMENTS

| | | |
|---|---|---|
| 4,332,428 A | 6/1982 | Maruyama |
| 4,392,168 A | 7/1983 | Maruyama et al. |
| 5,427,456 A | 6/1995 | Hensel |
| 5,540,504 A | 7/1996 | Cordova et al. |
| 5,667,309 A * | 9/1997 | Nose ........................ 384/132 |
| 5,707,154 A | 1/1998 | Ichiyama |
| 5,765,952 A | 6/1998 | Dekker et al. ............ 384/132 |
| 5,798,589 A | 8/1998 | Ohi et al. |
| 5,806,987 A * | 9/1998 | Nose et al. ................ 384/100 |
| 6,364,532 B1 * | 4/2002 | Yoshikawa et al. ........ 384/107 |
| 6,371,649 B1 * | 4/2002 | Kawawada et al. ........ 384/100 |

FOREIGN PATENT DOCUMENTS

| | | |
|---|---|---|
| JP | 57-92418 | 6/1982 |
| JP | 6-173943 | 6/1994 |
| JP | 7-31094 | 1/1995 |
| JP | 8-205459 | 8/1996 |
| JP | 10184691 | 7/1998 |

OTHER PUBLICATIONS

IPEA (in Japanese) for PCT/JP01/05979, dated Jan. 16, 2002.  
Patent Abstracts of Japan Publication No. 10–184691, (Translation for Reference AL above).

* cited by examiner

*Primary Examiner*—Thomas R. Hannon  
(74) *Attorney, Agent, or Firm*—Notaro & Michalos, PC

(57) ABSTRACT

A bearing has a thrust plate integrated with its shaft and a bearing member surrounds both. A radial pressure bearing portion and separate thrust portion generate pressure on a lubricating fluid in a gap between the shaft and bearing member. One end of the gap is closed while the other is open and has a capillary seal formed with an angle that is large at a boundary but smaller at increasing distance therefrom. The fluids fills the gap so that gas-fluid interface is where the angle is small and causes the thrust plate to float. A pressure mechanism forces the fluid from the open to the closed end and the quantity of fluid is set to fill the mechanism even if the gas-fluid interface moves.

12 Claims, 12 Drawing Sheets

HYDRODYNAMIC BEARING DEVICE

TECHNICAL TERM

A dynamic pressure surface used in this specification means a shaft portion or a bearing surface having dynamic pressure generating grooves provided thereto, and a circumferential surface of a bearing surface or a shaft portion in an area corresponding to the former shaft portion or the bearing surface. Further, a dynamic pressure bearing portion means an area configured by dynamic pressure surfaces and a lubricating fluid filled between the such surfaces, in which a dynamic pressure is generated. Furthermore, a bearing gap means all gaps between a shaft member, a thrust plate and a bearing member which surrounds them irrespective of presence/absence of generation of the dynamic pressure.

TECHNICAL FIELD

The present invention relates to a bearing apparatus. More particularly, the present invention relates to a dynamic pressure bearing apparatus which causes a shaft member and a bearing member to float so as to be capable of relative rotation by a dynamic pressure force of a lubricating fluid.

BACKGROUND ART

In recent years, there have been various proposals concerning a dynamic pressure bearing apparatus used to support various rotors such as a magnetic disk, a polygon mirror or an optical disk at a high speed. The dynamic pressure bearing apparatus, is applied to, e.g., such a motor as shown in FIG. 16, a bearing sleeve 2 as a bearing member is fitted to a shaft member 1 so as to be capable of relative rotation, and a radial dynamic pressure bearing portion RB is formed by injecting a lubricating fluid such as an oil into a predetermined very small gap formed by arranging a dynamic pressure surface provided on an outer surface of the shaft member 1 and a dynamic pressure surface provided on an inner surface of the bearing sleeve 2 so as to be opposed to each other in close proximity in the radial direction. Moreover, a dynamic pressure surface provided on a thrust plate 3 fixed to the shaft member 1 by tight fitting and a dynamic pressure surface on the bearing sleeve 2 and a counter plate 4 are oppositely arranged in close proximity to each other in the axial direction so as to form a predetermined very small gap, and a lubricating fluid such as an oil is injected into the small gap, thereby constituting thrust bearing portions SBa and SBb.

In addition, a pressure is applied to the lubricating fluid by the pumping action of dynamic pressure generating grooves (not shown) provided on at least each one of the opposed dynamic pressure surfaces of the radial dynamic pressure bearing portion RB, the thrust dynamic pressure bearing portions SBa and SBb so that a dynamic pressure is generated respectively, and both the shaft member 1 and the thrust bearing members 3 and 4 are rotationally supported while relatively floating in the radial direction and the thrust direction by the dynamic pressure.

Such a radial dynamic pressure bearing portion RB and thrust dynamic pressure bearing portions SBa and SBb are generally separated from each other and arranged in this manner. Therefore, when the lubricating fluid is independently filled in each dynamic pressure bearing portion, a quantity of the lubricating fluid is reduced as a whole, and the lubricating fluid is deteriorated due to oxidation or gelation or becomes insufficient due to evaporation or the like. As a result, the duration of life of the bearing is shortened, and there occurs a problem that the lubricating fluid is apt to leak due to a change in pressure or a change in temperature.

Based on the above fact, there has been developed a dynamic pressure bearing apparatus which can continuously fill the lubricating fluid in the entire area of the bearing gaps from the radial dynamic pressure bearing portion RB to the thrust dynamic pressure bearing portions SBa and SBb and increase a quantity of the lubricating fluid.

However, even if the entire area of the bearing gaps is completely filled with the lubricating fluid, air bubbles may be possibly generated at a negative pressure part produced in the bearing portion. Therefore, there is the risk that the lubricating fluid may be pushed toward the outside of the bearing by the air bubbles and the lubricating fluid may leak to the outside.

DISCLOSURE OF THE INVENTION

It is, therefore, an object of the present invention to provide a dynamic pressure bearing apparatus capable of excellently preventing a lubricating fluid from leaking to the outside with a simple structure.

To achieve this aim, according to the present invention, there is provided a dynamic pressure bearing apparatus comprising: a shaft member; a thrust plate which has a larger diameter than that of the shaft member and is integrated with the shaft member; a bearing member which surrounds the shaft member and the thrust plate from a radial direction and an axial direction, respectively; and a radial dynamic pressure bearing portion and a thrust dynamic pressure bearing portion which generate a dynamic pressure in a lubricating fluid filled in the bearing gaps between the shaft member, the thrust plate and the bearing member being formed so as to be separated from each other, wherein one end of the bearing gap in the axial direction is closed while the other end of the same is opened, a capillary seal portion which is formed in such a manner that am angle formed by opposed surfaces of the shaft member and the bearing member is large on the boundary with the bearing gap and continuously or discontinuously smaller as distanced from the boundary is arranged on the opened side at the other end of the bearing gap, the lubricating fluid is continuously filled in the entire bearing gap from the capillary seal portion so that a gas-liquid interface of the lubricating fluid is at a position where the angle is small in the capillary seal portion before the shaft member and the thrust plate relatively float, fluid pressure applying means which gives the lubricating fluid an inward pressure application force directed to the closed side from the opened side of the bearing gap is included, a quantity of the lubricating fluid to be filled is set to a quantity that the lubricating fluid fills the fluid pressure applying means even if movement of the gas-liquid interface to the bearing gap side occurs, which is generated when the shaft member and the thrust plate relatively float in the thrust direction.

Here, the fluid pressure applying means is preferably formed by utilizing a part of the bearing gap close to the opened side, or more preferably the dynamic pressure bearing portion close to the seal portion. (This may be referred to as a seal portion hereinafter.). For example, the fluid pressure applying means is constituted by determining the dynamic pressure grooves of the radial dynamic pressure bearing portion on the outer side close to the seal portion side as dynamic pressure generating grooves having a shape which generates an unbalanced dynamic pressure that a dynamic pressure having an inward vector component and a dynamic pressure having an outward vector component are simultaneously generated and the dynamic pressure having the inward vector component surpasses, or constituted by determining the dynamic pressure grooves of the thrust dynamic pressure bearing portion close to the outer side which is arranged to be close to the seal portion as dynamic pressure generating grooves having a shape which generates an unbalanced dynamic pressure that a dynamic pressure having an inward vector component and a dynamic pressure having an outward vector component are simultaneously generated and the dynamic pressure having the inward vector component surpasses, or constituted by the dynamic pressure grooves which are provided at a position immediately below the seal portion where they do not substantially adversely affect the function of the seal portion and which generate a dynamic pressure having an inward vector component.

According to the dynamic pressure bearing apparatus of the present invention having such a structure, the lubricating fluid in a space formed by the bearing gap (which will be simply referred to as a bearing gap in this specification) is constantly subject to pressure application toward the closed side of the bearing gap by the inward pressure application force giving action of the fluid pressure applying means, and the gas-liquid interface of the lubricating fluid in the bearing gap is maintained on the bearing inner side so as to be pushed toward the inner side by the inward pressure application force giving action, thereby excellently preventing the lubricating fluid from leaking from the seal portion provided on the opened side of the bearing gap.

On the other hand, in the thrust dynamic pressure bearing portion, when members which are in contact with each other while rotation is at a halt relatively float in the thrust direction and are separated from each other as rotation starts, the lubricating fluid flows into a part which has been in the contact state, namely, a space between the end portion of the shaft member and the counter plate concurrently with the floatation action. At this moment, the lubricating fluid whose quantity is required for inflow moves, the shortfall moves from the opened side to the closed side of the bearing gap, and the gas-liquid interface in the seal portion also moves to the bearing gap side in accordance with this movement. At this moment, since a quantity of the lubricating fluid to be filled is set to a quantity enough to fill the fluid pressure applying means even if movement of the gas-liquid interface toward the bearing gap side occurs, which is produced when the shaft member and the thrust plate relatively float in the thrust direction, the gas-liquid interface of the lubricating fluid which has moved to the bearing gap side does not reach the fluid pressure applying means which gives the inward pressure application force which is directed from the opened side to the closed side of the bearing gap, for example, the radial dynamic pressure generating grooves or the thrust dynamic pressure generating grooves having a shape which generates the unbalanced dynamic pressure that the dynamic pressure having an inward vector component and the dynamic pressure having an outward vector component are simultaneously generated and the dynamic pressure having the inward vector component surpasses, and the inward pressure application force giving action is not reduced. As a result, the above-described effect of preventing the lubricating fluid from leaking to the outside can be stably obtained. Additionally, the present invention can excellently avoid external leak of the lubricating fluid with the simple structure, prolong the duration of life of the dynamic pressure bearing apparatus and increase the reliability. In particular, when the fluid pressure applying means is constituted by utilizing the radial dynamic pressure generating grooves or the thrust dynamic pressure generating grooves, there is no restriction in space, and the simpler structure can be realized without requiring additional groove machining.

Further, it is preferable that the seal portion of the dynamic pressure bearing apparatus according to the present invention is defined between the shaft member and the inner surface of the enlarged hole of the bearing member which accommodates the shaft member, and the large part and the small part of the angle formed by the opposed surfaces of the shaft member and the bearing member are defined by the cross-sectional outline having a polygonal line figure along with an axial plane of the inner surface or the cross-sectional outline having a continuously curved ling figure, respectively. Furthermore, in the dynamic pressure bearing apparatus according to the present invention, it is preferable that a capacity L which can hold the lubricating fluid in the capillary seal portion is a capacity configured by a range from a minimum gap quantity and a maximum gap quantity in the capillary seal portion obtained by gradually increasing a gap quantity between the shaft member and the bearing member constituting the radial dynamic pressure bearing portion. Concretely, in the dynamic bearing apparatus according to the present invention, assuming that L is a capacity capable of holding the lubricating fluid in the seal portion, r is a radius of the shaft member and f is a floatation quantity at the time of relative floatation of the thrust plate, it is preferable to set to satisfy a conditional expression of $L > \pi r^2 \times f$. In this case, the lubricating fluid can fill the fluid pressure applying means even when movement of the gas-liquid interface toward the bearing gap side occurs which is produced when the shaft member and the thrust plate relatively float in the thrust direction.

Moreover, in the dynamic pressure bearing apparatus according to the present invention, an angle formed by opposed surfaces of the shaft member and the bearing member constituting the capillary seal portion is designed so as to be large at the boundary with the bearing gap and become continuously or discontinuously smaller as distanced away from the boundary, and the lubricating fluid is filled so that the gas liquid interface of the lubricating fluid is at a position where the angle is small in the capillary seal portion before the shaft member and the thrust plate relatively float. In this case, a capacity of the seal portion is increased, and the duration of life of the bearing is prolonged. Also, a positional movement quantity of the gas-liquid interface of the lubricating fluid is restricted to a small range, and hence it is particularly effective when the entire apparatus is reduced in thickness.

In addition, the dynamic bearing apparatus according to the present invention is provided with magnetic suction means for generating a suction force corresponding to the floatation force produced at the thrust bearing portion based on provision of the inward pressure application force. For example, when the dynamic pressure bearing apparatus according to the present invention is applied to a motor having a rotor portion with a rotor magnet and a stator portion with a stator core, it is preferable to provide a magnetic suction member which generates a suction force corresponding to a floatation force of the thrust bearing portion at a position opposed to the rotor magnet. In this case, it is further preferable that the magnetic suction member is constituted so as to generate a suction force larger than a weight of a rotation side member. Additionally, the magnetic suction member is characterized by consisting of a silicon steel plate or permalloy.

When a pressure is applied to the lubricating fluid in the bearing gap toward the closed side based on provision of the inward pressure application force of the fluid pressure applying means, a floatation quantity in the axial direction in the thrust dynamic pressure bearing portion is increased by a quantity corresponding to the pressure application, the bearing gap in the thrust dynamic pressure bearing portion becomes uneven, and an increase in the bearing loss torque can be considered. In the present invention, however, the magnetic suction means for generating a suction force corresponding to provision of the inward pressure application force of the fluid pressure applying means is provided, and the bearing gap in the thrust dynamic pressure bearing portion is evenly maintained by the magnetic suction means. As a result, an increase in the bearing loss torque can be excellently avoided. Further, when the magnetic suction member which generates a suction force corresponding to a floatation force of the thrust bearing portion is provided at a position opposed to the rotor magnet, the magnetic force of the rotor magnet can be utilized, and hence the magnetic suction force can be obtained by only providing the magnetic suction member, thereby simplifying the structure.

Furthermore, when the bearing gap is used with the opened side thereof facing downward, the effect of preventing the lubricating fluid from leaking to the outside can be stably realized by adopting the magnetic suction member having a suction force larger than a weight of a rotation side member as with the present invention, and the rotation side member can be excellently prevented from coming off in the axial direction.

BEST MODE FOR CARRYING OUT OF THE INVENTION

Although an embodiment in which the present invention is applied to a hard disk drive (which will be referred to as an HDD hereinafter) will be described hereunder, the entire structure of the HDD will be first explained with reference to the accompanying drawings.

Figure 1:
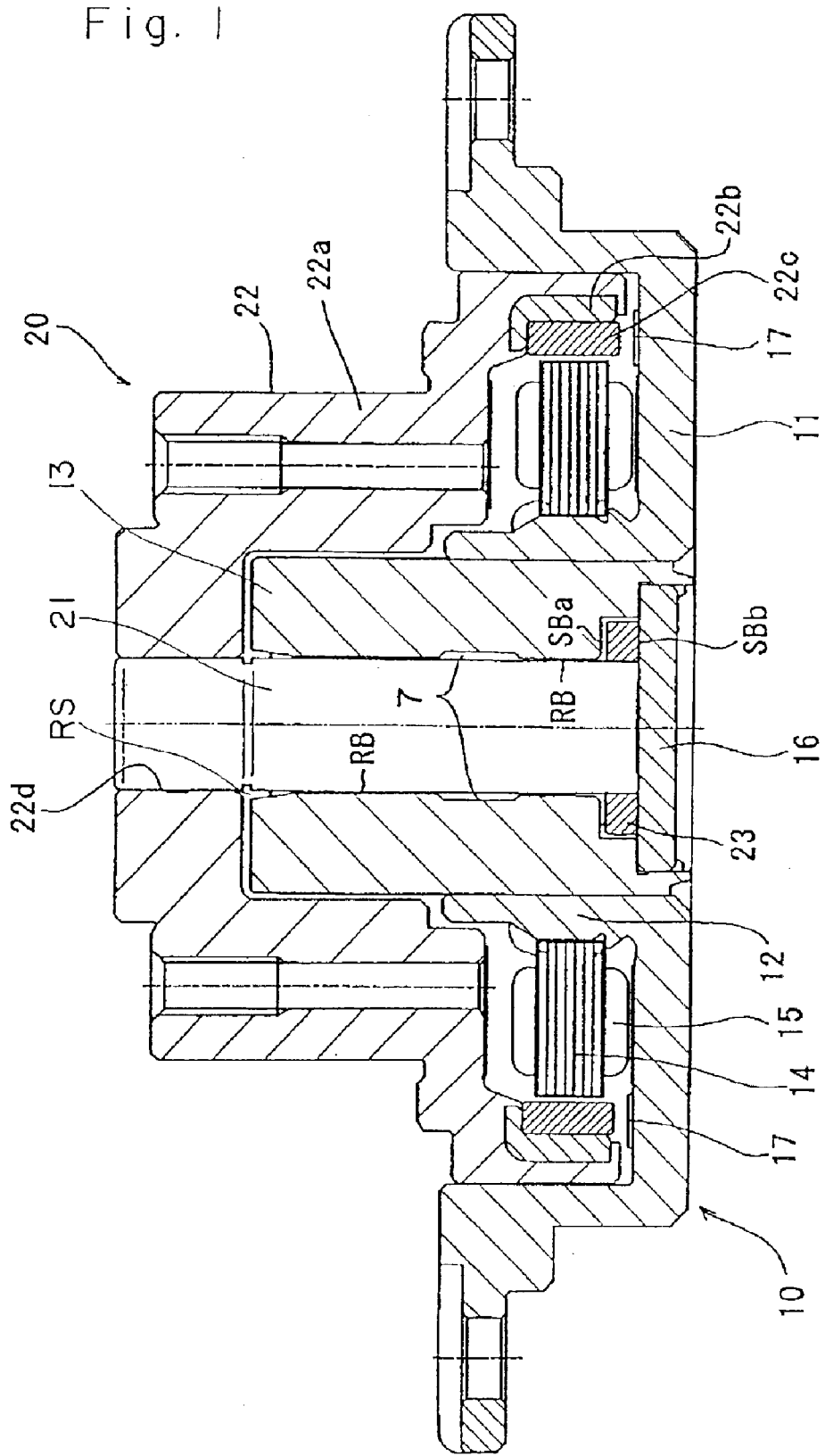
FIG. 1 is a vertical cross-sectional explanatory view showing a structural example of an HDD motor including a dynamic pressure bearing apparatus according to an embodiment of the present invention.

An HDD spindle motor which is of an axial rotation type shown in FIG. 1 is constituted by a stator unit 10 as a fixing member and a rotor unit 20 as a rotation member assembled to the stator unit 10 from the upper side in the drawing. In these units, the stator unit 10 has a fixed frame 11 which is screwed to a non-illustrated fixing base. This fixed frame 11 is formed of aluminium or an aluminium alloy based metal material in order to reduce the weight. Further, a bearing sleeve 13 as a fixed bearing member formed into a hollow cylindrical shape is joined to an annular bearing holder 12, which is formed so as to be erect at the substantially central part of the fixed frame 11, by press fitting or shrink fitting on the inner side of the bearing holder 12. This bearing sleeve 13 is formed of a general bearing metal consisting of a copper based alloy material such as phosphor bronze in order to facilitate boring of a small diameter or the like.

Furthermore, a stator core 14 consisting of a laminated body of magnetic steel sheets is fitted on an outer peripheral attachment surface of the bearing holder 12. A drive coil 15 is wound around each salient pole portion provided to the stator core 14.

Moreover, a rotatable shaft 21 constituting the rotor unit 20 is rotatably inserted into the bearing hole of the bearing sleeve 13. The rotatable shaft 21 in this embodiment is made of stainless steel.

Figure 3:
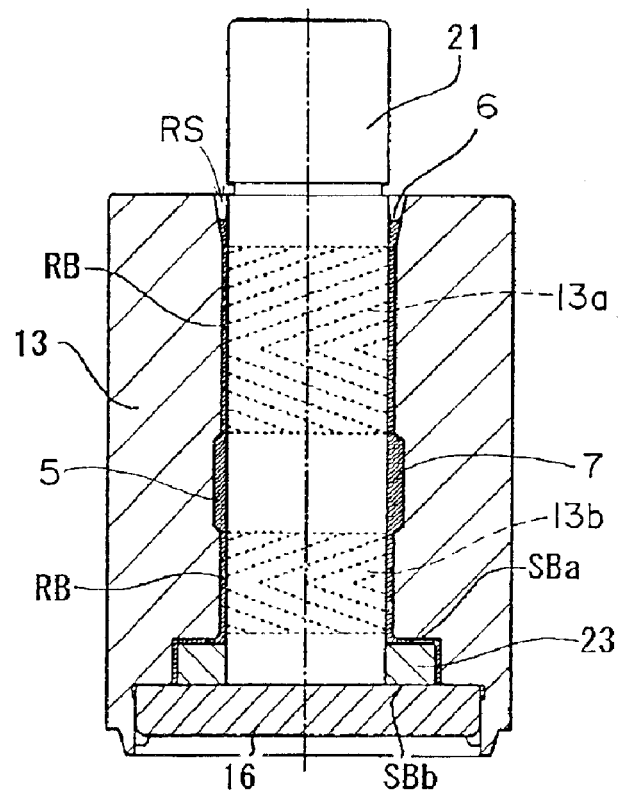
FIG. 3 is a partial vertical cross-sectional explanatory view corresponding to FIG. 2, which shows a rotation halt state of the dynamic pressure bearing apparatus depicted in FIG. 1.

In addition, the dynamic pressure surface formed on the inner peripheral surface of the bearing hole in the bearing sleeve 13 is arranged so as to be opposed to the dynamic pressure surface formed on the outer peripheral surface of the rotatable shaft 21 in the radial direction, and two radial dynamic pressure bearing portions RB and RB are formed so as to be separated from each other in the axial direction in a small bearing gap between these surfaces. In detail, the dynamic pressure surface on the bearing sleeve 13 side and the dynamic pressure surface on the rotatable shaft 21 side in each radial dynamic pressure bearing portion RB are fitted to each other so as to form a very small gap of several μm on the circumference, and a lubricating fluid 5 consisting of a lubricating oil, a magnetic fluid or the like is injected into the small bearing gap. At this moment, as shown in FIG. 3, a fluid tank portion 7 is provided between the two radial dynamic pressure bearing portions RB and RB provided so as to be separated from each other in the axial direction, and the lubricating fluid 5 is filled in the bearing gap including the two radial dynamic bearing portions RB, RB and the fluid tank portion 7 so as to be continuous in the axial direction.

Figure 2:
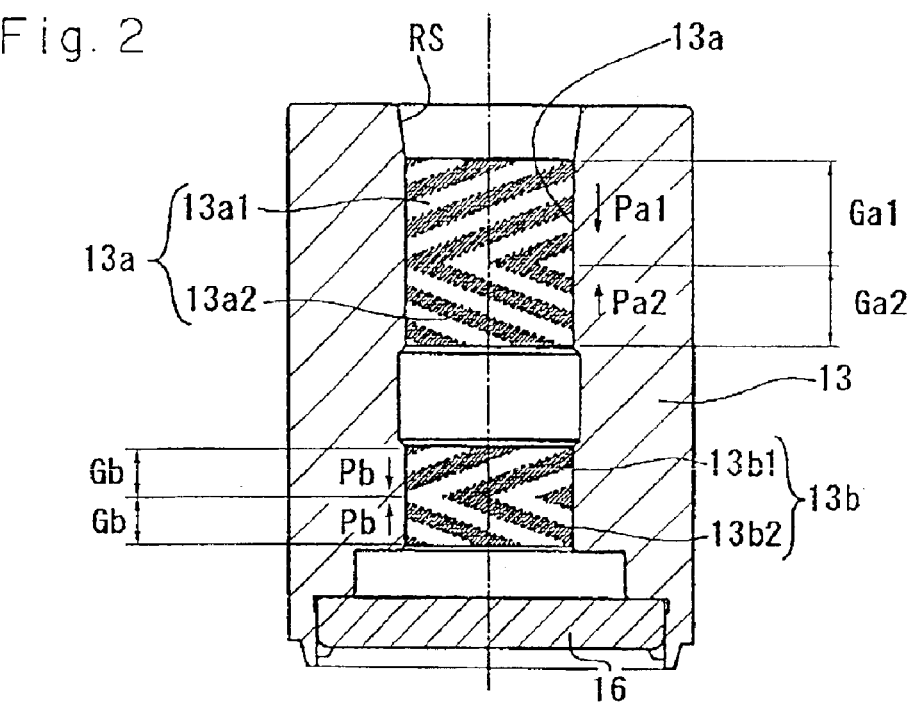
FIG. 2 is a vertical cross-sectional explanatory view showing a structure of a bearing member used in the dynamic pressure bearing apparatus illustrated in FIG. 1.

Further, radial dynamic pressure generating grooves 13a and 13b having a substantially herringbone shape like "<" such as shown in FIG. 2 are annularly formed in two blocks in the axial direction on the dynamic pressure surface of the bearing sleeve 13, and a pressure is applied to the lubricating fluid 5 by the pumping action of both radial dynamic pressure generating grooves 13a and 13b at the time of rotation, which results in generation of the dynamic pressure. Also, a later-described rotatable hub 22 is configured to be axially supported while floating in the radial direction together with the rotatable shaft 21 by the dynamic pressure of the lubricating fluid 5.

At this moment, the opening of the bearing sleeve 13 at the lower end side in the drawing is closed by a later-described counter plate 16, and the upper end side in the drawing of the bearing sleeve 13 is opened toward the outside of the bearing. Consequently, the above-described bearing gap is also closed at the lower end side in the drawing and opened at the upper end side in the drawing. Furthermore, the radial dynamic pressure generating grooves 13b arranged on the closed side (lower side in the drawing: counter plate 16 side) of the bearing gap has both an upper inclined groove 13b1 provided on the upper side in the drawing and a lower inclined groove 13b2 provided on the lower side in the drawing being formed so as to have substantially the same length Gb in the axial direction, and a dynamic pressure force Pb balanced in the axial direction is generated by the both inclined grooves 13b1 and 13b2 having the same length.

On the contrary, the radial dynamic pressure generating grooves 13a arranged on the opened side (upper side in the drawing: seal portion RS side) of the bearing gap are formed in such a manner that the axial length of the upper inclined groove 13a1 provided on the upper side in the drawing is longer than the axial length Ga2 of the lower inclined groove 13a2 provided on the lower side of the drawing (Ga1>Ga2), and an unbalanced dynamic pressure such that the pressure application force Pa1 by the upper inclined groove 13a1 is larger than the pressure application force Pa2 of the lower inclined groove 13a2 is generated by such an asymmetric groove shape (Pa1>Pa2). That is, the radial dynamic pressure generation groove 13a arranged on the opened side of the bearing gap (upper side in the drawing) also functions as fluid pressure applying means which provokes the pumping action to apply the pressure to the lubricating fluid 5 toward the closed side placed on the inner side from the opened side positioned on the outer side by determining Ga1>Ga2, and the fluid pressure applying means constantly gives the inward pressure application force to the lubricating fluid 5.

Moreover, a capillary seal portion RS as a seal portion is arranged at the outer end portion (upper end part in the drawing) of the radial dynamic pressure generating grooves 13a arranged on the opened side (upper side in the drawing) of the bearing gap. This capillary seal portion RS provides a seal function which prevents the lubricating fluid 5 from leaking by utilizing the capillary phenomenon of the lubricating fluid 5, and a space in which the terminal portion of the bearing gap is gradually increased toward the outside of the bearing is formed by the inclined surface formed on the rotatable shaft 21 or the bearing sleeve 13 side. For example, it is formed into a tapered surface which extends in the gap from 20 μm to 300 μm. A capacity of the capillary seal portion RS is set in such a manner that the interface (gas-liquid interface) between the lubricating fluid 5 and the outside air formed therein is positioned in the capillary seal portion RS when the motor is either rotated or stopped.

On the other hand, a discoid thrust plate 23 is fixed at the end portion of the rotatable shaft 21 on the lower end side in the drawing. This thrust plate 23 is arranged so as to be accommodated in a cylindrical recession provided at the central part of the above-described bearing sleeve 13 on the lower end side in the drawing, and the dynamic pressure surface provided on the upper surface of the thrust plate 23 is arranged so as to be opposed to the dynamic pressure surface formed on the lower surface on the bearing sleeve 13 side so as to be close in the axial direction in the recession of the bearing sleeve 13. Further, an upper thrust dynamic pressure bearing portion SBa is formed in the bearing gap of the both dynamic pressure surfaces of the thrust plate 23 and the bearing sleeve 13. It is to be noted that the thrust plate 23 and the rotatable shaft 21 are fixed and integrated by tight fitting such as press fitting or shrink fitting in this embodiment but they may be integrally molded from the beginning in some cases.

Furthermore, a counter plate 16 consisting of a discoid member having a relatively large diameter is arranged in close proximity to the dynamic pressure surface of the thrust plate 23 on the lower side in the drawing. This counter plate 16 is fixed so as to close the opened portion of the bearing sleeve 13 on the lower end side, and a lower thrust dynamic pressure bearing portion SBb is formed by a space between the dynamic pressure surface (upper surface) opposed to the thrust plate 23 of the counter plate 16 and the dynamic pressure surface (lower surface) opposed to the counter plate 16 of the thrust plate 23 and the lubricating fluid 5 filled in this space. It is to be noted that the counter plate 16 and the bearing sleeve 13 are sealed and integrated in the liquid-tightness state by tight fitting such as press fitting or caulking.

As described above, both dynamic pressure surfaces on the thrust plate 23 side constituting a pair of the thrust dynamic pressure bearing portions SBa and SBb arranged so as to be adjacent to each other in the axial direction and the both dynamic pressure surfaces on the bearing sleeve 13 side and the counter plate 16 side which are opposed to the former surfaces are arranged so as to be opposed to each other in the axial direction through a small gap of several μm, respectively, and the same lubricating fluid 5 is filled in the bearing gap consisting of the small gap continuously from the above-described radial dynamic pressure bearing portion RB. The lubricating fluid 5 is continuous in the axial direction through the outer peripheral side path of the thrust plate 23.

Figure 4:
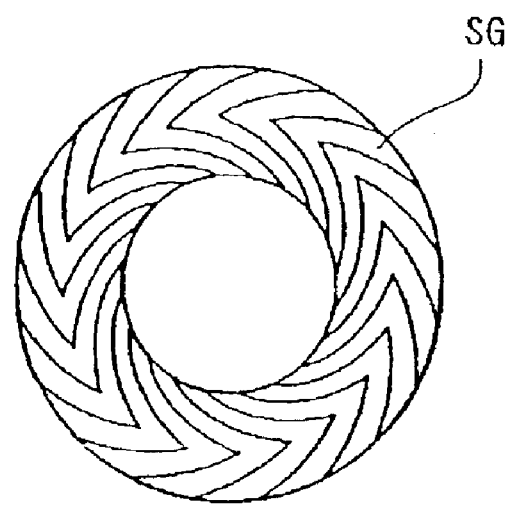
FIG. 4 is a plan explanatory view showing an example of a thrust dynamic pressure generating grooves used in the dynamic pressure bearing apparatus depicted in FIG. 1.

Moreover, dynamic pressure generating grooves SG having a herringbone shape such as shown in FIG. 4 are annularly provided on at least one side of the dynamic pressure surfaces of the thrust plate 23 and the dynamic pressure surfaces of the bearing sleeve 13 and the counter plate 16. At the time of rotation, the pressure is applied to the lubricating fluid 5 by the pumping action of the thrust dynamic pressure generating grooves SG, thereby generating the dynamic pressure. With this dynamic pressure of the lubricating fluid 5, the rotatable shaft 21 and the rotatable hub 22 are supported at their axes in the thrust direction.

On the other hand, the rotatable hub 22 constituting the rotor unit 20 together with the rotatable shaft 21 is constituted by a substantially-cup-like member consisting of aluminium or aluminium alloy based metal so as to mount a non-illustrated storage medium such as a magnetic disk thereon, and a joint hole 22d provided at the central part of the rotatable hub 22 is integrally joined to the upper portion in the drawing of the rotatable shaft 21 by press fitting or shrink fitting.

The rotatable hub 22 has a drum portion 22a with a substantially cylindrical shape having a storage medium disk mounted on an outer peripheral portion thereof, and an annular drive magnet 22c is attached to the drum portion 22a on the inner peripheral wall side on the lower side in the drawing through a back yoke 22b. The annular drive magnet 22c is arranged in close proximity so as to be annularly opposed to the outer peripheral side end surface of the salient pole portion of the above-described stator core 14.

Figure 5:
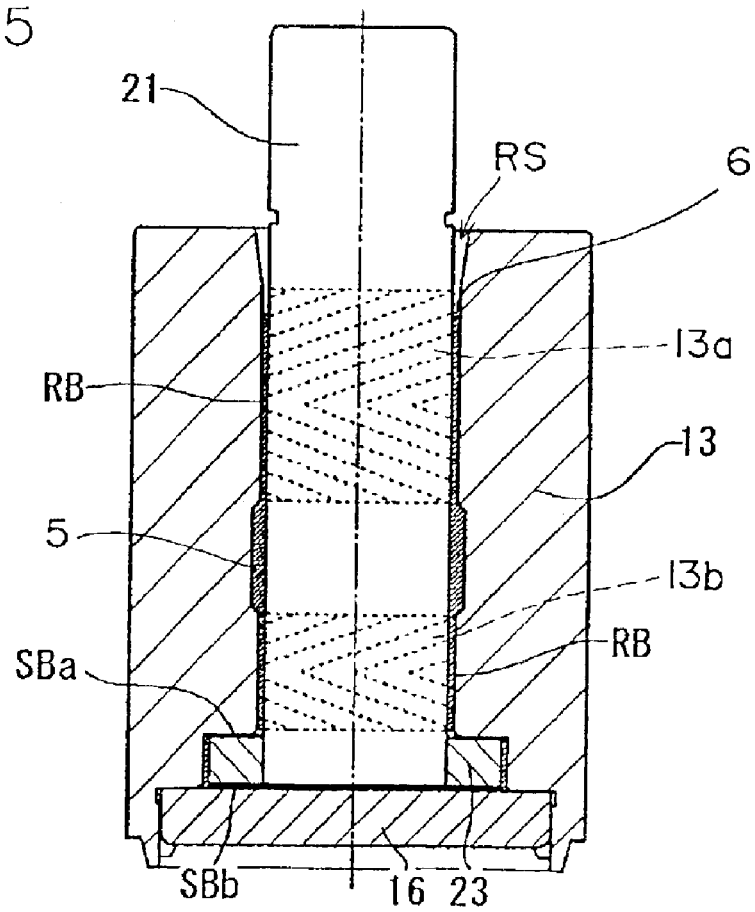
FIG. 5 is a partial vertical cross-sectional explanatory view corresponding to FIG. 2 to which the present invention is not applied, which shows a rotation starting state of the dynamic pressure bearing apparatus depicted in FIG. 1.

In addition, a quantity of the lubricating fluid 5 continuously filled from the capillary seal portion RS to the bearing gaps of the radial dynamic bearing portion RB and the thrust dynamic bearing portions SBa and SBb is set to the following quantity. That is, in the thrust dynamic pressure bearing portions SBa and SBb, the rotatable shaft 21 and the thrust plate 23, which were in contact with the counter plate 16 as shown in FIG. 3 when rotation was stopped, float in the thrust direction as shown in FIG. 5 and are separated upward when rotation starts, and the lubricating fluid 5 flows into the part, which was in the contact state, concurrently with the floatation effect. As a result, the lubricating fluid 5 in the bearing gaps whose quantity corresponds to a quantity of the same which flowed into the contact part moves toward the inner side which is the lower side in the drawing, and the gas-liquid interface 6 in the capillary seal portion RS also moves so as to lower to the inner side. At this moment, when the gas-liquid interface 6 of the lubricating fluid 5 which has moved to the inner side moves down too much as show in FIG. 5 for example, the gas-liquid interface 6 of the lubricating fluid 5 is positioned in the radial dynamic pressure generating grooves 13a with an asymmetric shape which generate the unbalanced dynamic pressure on the opened side (seal portion RS side), thereby reducing the inward pressure application force generated in the radial dynamic pressure generating grooves 13a. Thus, in this embodiment, a quantity of the lubricating fluid 5 to be filled is set to a quantity which can supplement a quantity of downward movement of the gas-liquid interface 6 while taking into consideration a quantity of downward movement of the gas-liquid interface 6 of the lubricating fluid 5 at the time of floatation in the thrust direction so that the inward pressure application force in the radial dynamic pressure generating grooves 13a is not reduced, and the gas-liquid interface 6 is positioned at the capillary seal portion RS irrespective of inward movement of the gas-liquid interface 6, thereby stably maintaining the inward pressure application force providing effect.

Incidentally, it is preferable to set a quantity of downward movement of the gas-liquid interface 6 of the lubricating fluid 5 so as not to reach the upper inclined groove 13a1 of the radial dynamic pressure generation grooves 13a on the upper side in the drawing.

Figure 6:
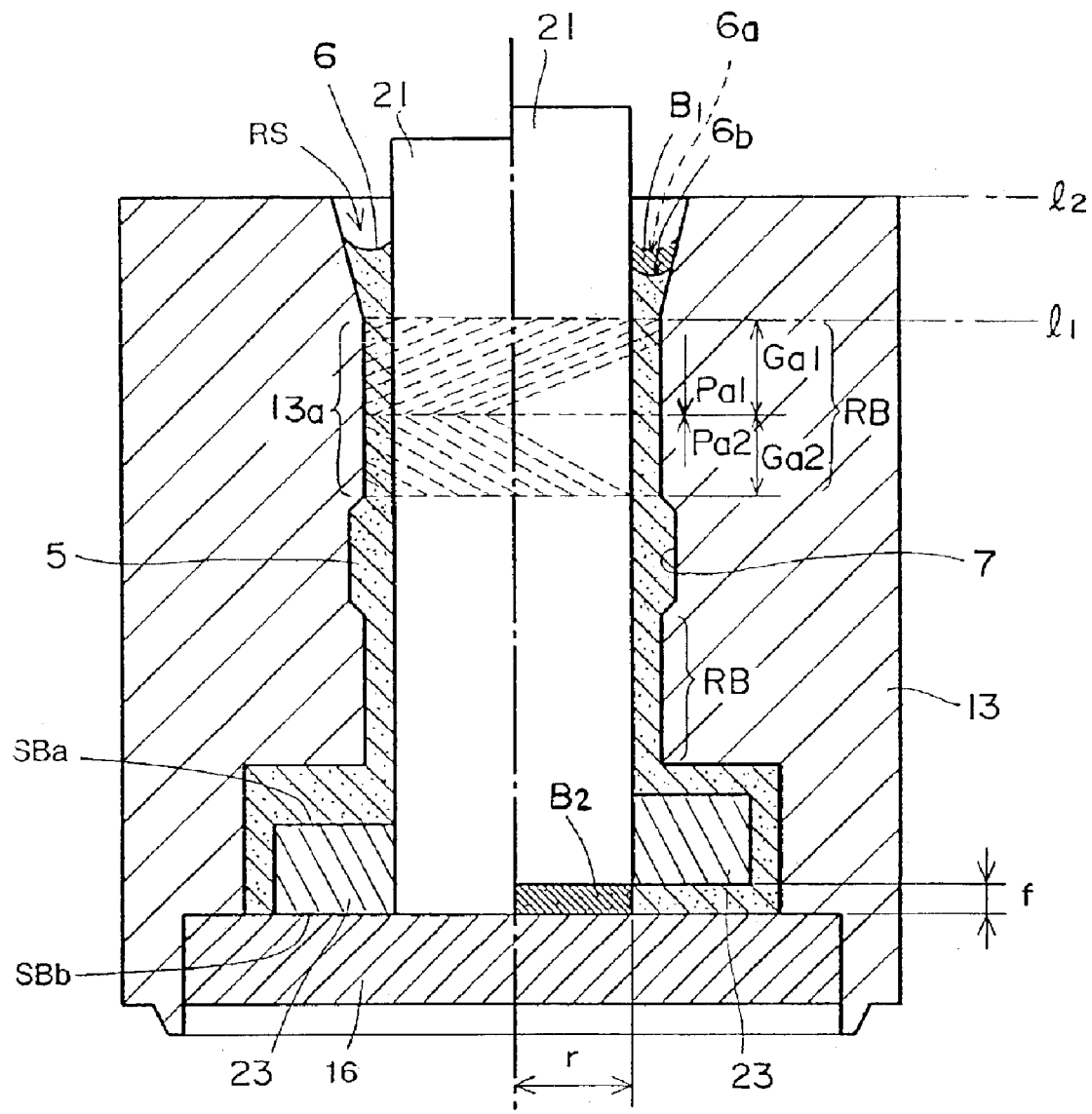
FIG. 6 is a partial vertical cross-sectional explanatory view showing the state of a gas-liquid interface of a lubricating fluid at the time of a rotation halt and rotation of the dynamic pressure bearing apparatus according to the present invention.

A further concrete embodiment of the gas-liquid interface 6 of the lubricating fluid 5 when the dynamic pressure bearing apparatus according to the present invention is stopped from rotating and when it is rotated (floatation) with reference to FIG. 6. The left half of FIG. 6 is a vertical cross-sectional explanatory view showing the halt state of the dynamic pressure bearing apparatus, and the right half of the same is a vertical cross-sectional explanatory view showing the rotation state of the dynamic pressure bearing apparatus. It is to be noted that a floatation quantity, a bearing gap and others are exaggerated in FIG. 6 for the sake of convenience for explanation and they are not necessarily the same as the actual states.

When the rotatable shaft 21 and the thrust plate 23 are stopped, as shown in the left half of FIG. 6, since the dynamic pressure is not generated at a pair of the thrust dynamic pressure bearing portions SBa and SBb arranged in the axial direction, the thrust plate 23 is in contact with the counter plate 16, and the rotatable shaft 21 and the thrust plate 23 do not float in the thrust direction. At this moment, the gas-liquid interface of the lubricating fluid 5 is positioned at a part 6a in the capillary seal portion RS.

Then, when the rotatable shaft 21 and the thrust plate 23 start rotating, as shown in the right half of FIG. 6, the dynamic pressure is generated at the thrust dynamic pressure bearing portions SBa and SBb, and the rotatable shaft 21 and the thrust plate 23 float in the thrust direction. A floatation quantity f at this moment is maintained substantially constant during rotation of the dynamic pressure bearing apparatus, and the floatation quantity f is set to approximately 5 $\mu$m to 15 $\mu$m in case of this dynamic pressure bearing apparatus. When the floatation quantity f is not more than 5 $\mu$m, the rotation resistance becomes large, and a necessary current value is increased. When the floatation quantity f is not less than 15 $\mu$m, the vertical shock may occur in the thrust plate 23 and the rotatable shaft 21 in the thrust direction, and the oscillation accuracy of a storage medium disk mounted on the rotatable hub may be deteriorated.

When the rotatable shaft 21 and the thrust plate 23 float, the lubricating fluid 5 on the upper side in the drawing moves to the lower side in the drawing, and the gas-liquid interface moves down to a position 6b from a position 6a. However, a quantity of the lubricating fluid 5 is set to a quantity with which the inward pressure application force by the unbalanced radial dynamic pressure generating grooves can be maintained irrespective of downward movement of the gas-liquid interface. That is, a fluid retention enabling capacity L in the capillary seal portion RS is set in such a manner that the gas-liquid interface is positioned in the capillary seal portion even if the gas-liquid interface moves down to the maximum level, namely, that it does not reach a position "11" in FIG. 6, and a quantity of the lubricating fluid 5 to be filled is also set. Additionally, if the quantity of the lubricating fluid 5 to be filled is set so as not to reach the position "11" in FIG. 6 at the time of floatation of the thrust plate 23, the fluid retention enabling capacity L in the capillary seal portion RS is set in such a manner that the position 6a of the gas-liquid interface at the time of halt does not reach the upper limit position of the capillary seal portion RS, namely, a position "12" in FIG. 6.

As shown in the right half of FIG. 6, although the quantity of the lubricating fluid 5 in the capillary seal portion RS is reduced by B due to floatation of the thrust plate 23, the quantity of the lubricating fluid 5 on the thrust plate 23 side is increased by $B_2$ which is the same quantity as $B_1$ reduced in the seal portion RS. Assuming that r is a radius of the rotatable shaft 21 and f is a floatation quantity of the thrust plate 23, the quantities of $B_1$ and $B_2$ can be represented by the following expression (1):

$$B_1(B_2) = \pi r^2 \times f \quad (1)$$

Incidentally, the lower surface portion of the thrust plate 23 can be interpreted as that the lubricating fluid 5 in the upper surface portion of the thrust plate 23 has moved to the lower side, and movement of a quantity of the lubricating fluid 5 in the capillary seal portion RS does not have to be taken into consideration.

In order to maintain provision of the inward pressure application force by the radial dynamic pressure generating grooves, the fluid retention enabling capacity L is set so as to satisfy the following conditional expression (2):

$$L > \pi r^2 \times f \quad (2)$$

More concretely, since the floatation quantity f of the dynamic pressure bearing apparatus is set to approximately 5 μm to 15 μm as described above and the radius of the rotatable shaft is set to approximately 1 mm to 2 mm, the following expression can be obtained based on the expression (2):

$$L > 5\pi/1000 \text{ ml to } 60\pi/1000 \text{ ml}$$

By setting the capacity in the capillary seal portion RS to this value or above, provision of the inward pressure application force relative to the lubricating oil by the unbalanced radial dynamic pressure generating grooves can be maintained irrespective of downward movement of the gas-liquid interface.

On the other hand, a magnetic suction member 17 is attached to the fixed frame 11 in close proximity to the lower surface side of the annular drive magnet 22c in FIG. 1. This magnetic suction member 17 consists of a material which reduces an eddy current, e.g., silicon steel or permalloy, and is configured to generate the suction force corresponding to the thrust floatation force generated to the thrust bearing portions SBa and SBb by the inward pressure application force provision effect obtained by the radial dynamic pressure generating grooves 13a having a shape to generate the unbalanced dynamic pressure.

That is, when the pressure is applied to the lubricating fluid 5 in the bearing gap toward the closed side on the lower side in the drawing by using the unbalanced dynamic pressure involving the inward pressure application force obtained by the radial dynamic pressure generating grooves 13a, as shown in FIG. 6, a quantity of thrust floatation in the lower thrust dynamic pressure bearing portion SBb is larger than a quantity of floatation of the upper thrust dynamic pressure bearing portion SBa by a quantity corresponding to the inward pressure application. As a result, the bearing gaps in the thrust dynamic pressure bearing portions SBa and SBb become uneven, and the bearing loss torque might be increased. Thus, in this embodiment, the magnetic suction member 17 which generates the suction force corresponding to the unbalanced dynamic pressure involving the inward pressure application force of the radial dynamic pressure generating grooves 13a is provided, and the bearing gaps in the thrust dynamic pressure bearing portions SBa and SBb are maintained in the even state, thereby excellently preventing the bearing loss torque from being increased.

Further, in this embodiment, on the assumption that the opened side of the bearing gap is used with the opened side down, the suction force of the magnetic suction member 17 is set to be larger than a total weight of the rotor unit 20 as a rotatable member. By providing such a magnetic suction member 17, the effect of preventing the lubricating fluid 5 from leaking outside can be stably obtained, and unnecessary movement of the rotor unit 20 as a rotatable member in the axial direction is excellently avoided.

As described above, according to the dynamic pressure bearing apparatus of this embodiment, the pressure is constantly applied to the lubricating fluid 5 in the bearing gap toward the closed side of the bearing gap by provision of the inward pressure application force generated in the radial dynamic pressure generating grooves 13a, and the gas-liquid interface of the lubricating fluid 5 in the bearing gap is thereby held so as to be pushed toward the inner side. Therefore, the lubricating fluid 5 can be excellently prevented from leaking from the capillary seal portion RS provided on the opened side of the bearing gap.

Furthermore, in the above-described embodiment, since a quantity of the lubricating fluid 5 to be filled is set to a quantity with which the inward pressure application force of the radial dynamic pressure generating grooves 13a is not reduced, the effect of preventing the lubricating fluid 5 from leaking outside can be stably obtained.

Moreover, in this embodiment, since the magnetic suction member 17 which generates the suction force corresponding to the inward pressure application force generated in the radial dynamic pressure generating grooves 13a is provided, the bearing gap in the thrust dynamic pressure bearing portions SBa and SBb can be maintained in the uniform state, thereby excellently avoiding an increase in the bearing loss torque.

Figure 7:
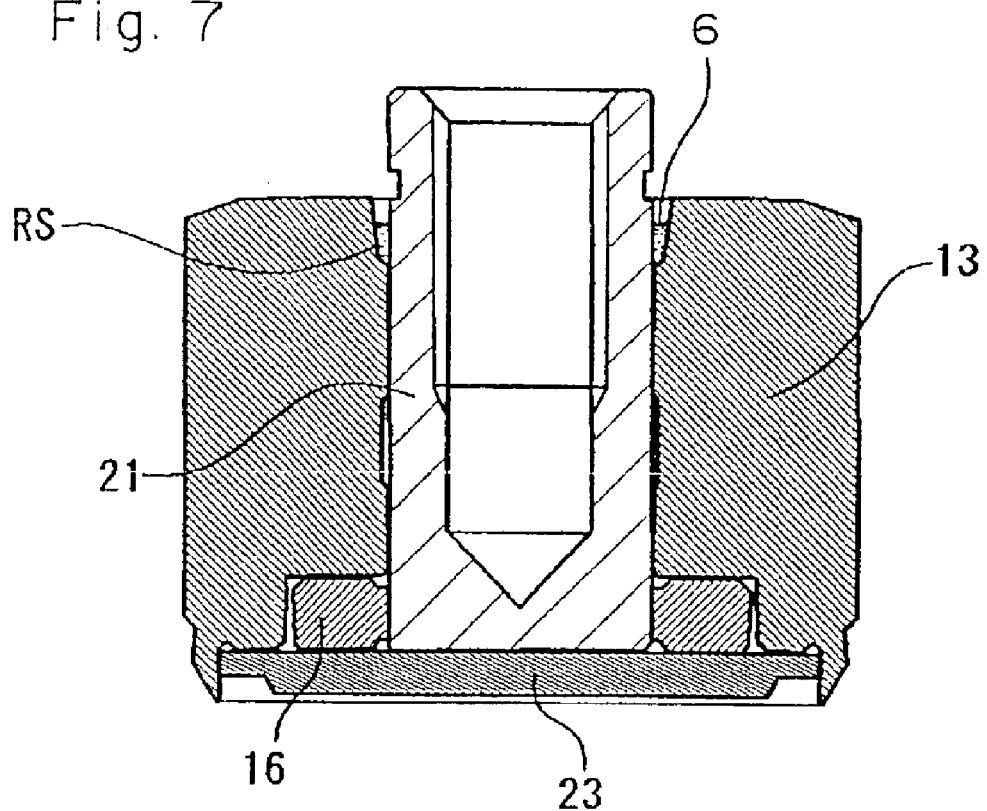
FIG. 7 is a partial vertical cross-sectional explanatory view showing a structure of a dynamic pressure bearing apparatus according to another embodiment of the present invention.
Figure 8:
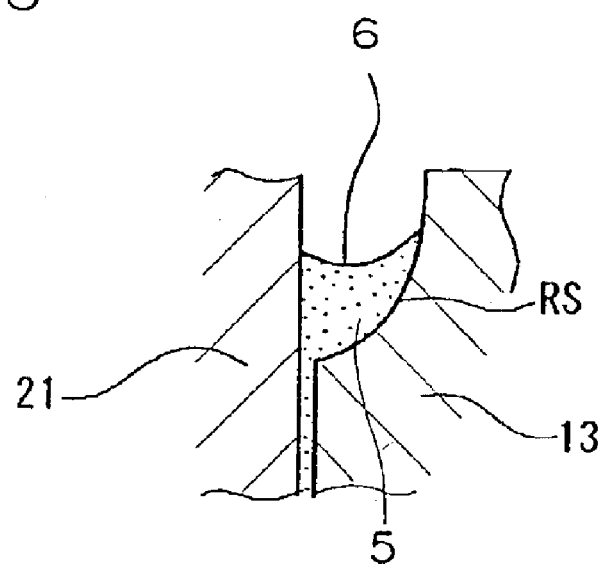
FIG. 8 is a partially enlarged vertical cross-sectional explanatory view showing an example of the shape of a seal portion in the embodiment of FIG. 6.
Figure 9:
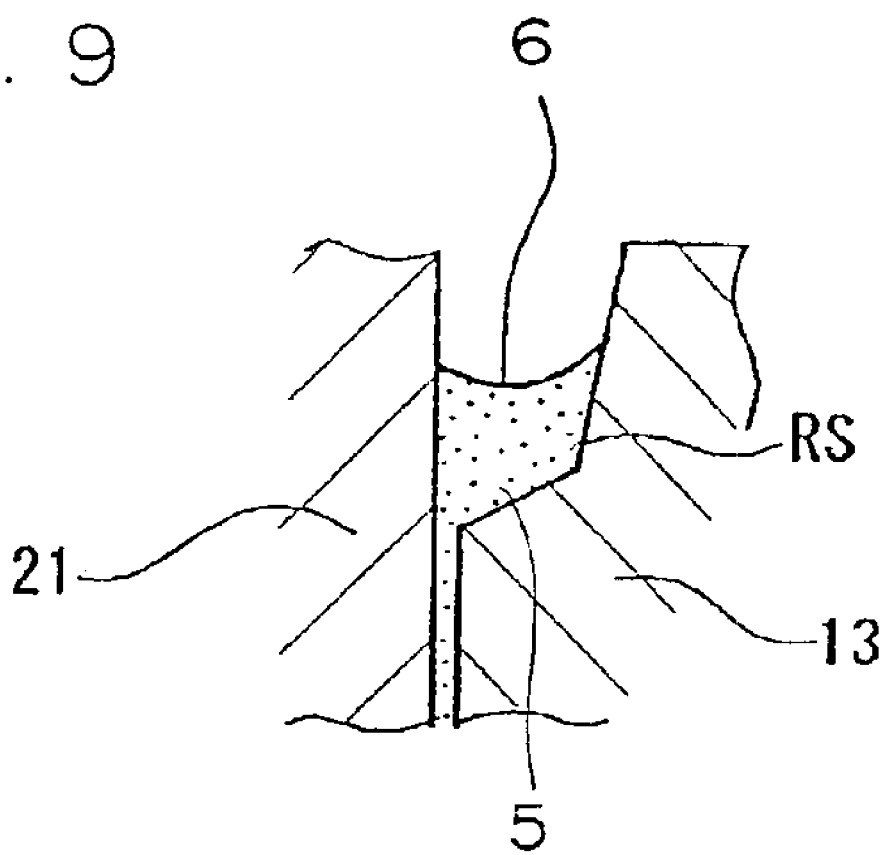
FIG. 9 is a partially enlarged vertical cross-sectional explanatory view showing another example of the shape of the seal portion in the embodiment of FIG. 6.

At this moment, in case of the dynamic pressure bearing apparatus which is thinned in the axial direction as shown in FIG. 7 in particular, it is preferable that the capillary seal portion RS is formed in such a manner that an angle (angle in the tangential direction) formed by the rotatable shaft 21 as a shaft member constituting this apparatus and the opposed surface of the bearing sleeve 13 as a bearing member is large on the boundary with the bearing gap as shown in FIG. 8 or 9 and continuously small as distanced from the boundary (see FIG. 8) or discontinuously small (see FIG. 9). That is, the capillary seal portion is preferably defined between the shaft member and the inner surface of the enlarged hole of the bearing portion which accommodates the shaft member, and the large part and the small part of the angle formed by the opposed surfaces of the shaft member and the bearing member are defined by the cross-sectional outline having a polygonal line figure along with an axial plane of the inner surface as shown in FIG. 9 or the cross-sectional outline having a continuously curved line figure as shown in FIG. 8, respectively.

As described above, when an angle formed by the rotatable shaft 21 formed by partitioning the capillary seal portion RS from the bearing gap and the opposed surface of the bearing sleeve 13 is formed so as to be large on the boundary with the bearing gap and continuously or discontinuously small toward the outside of the bearing as distanced from the boundary within the range where the seal function is not adversely affected, the capacity of the capillary seal portion RS is increased, and the long duration of life of the bearing apparatus is achieved. Also, a quantity of movement of the position of the gas-liquid interface 6 of the lubricating fluid 5 is suppressed in a small range, and this is particularly effective when the entire bearing apparatus is thinned as with this embodiment.

Figure 10:
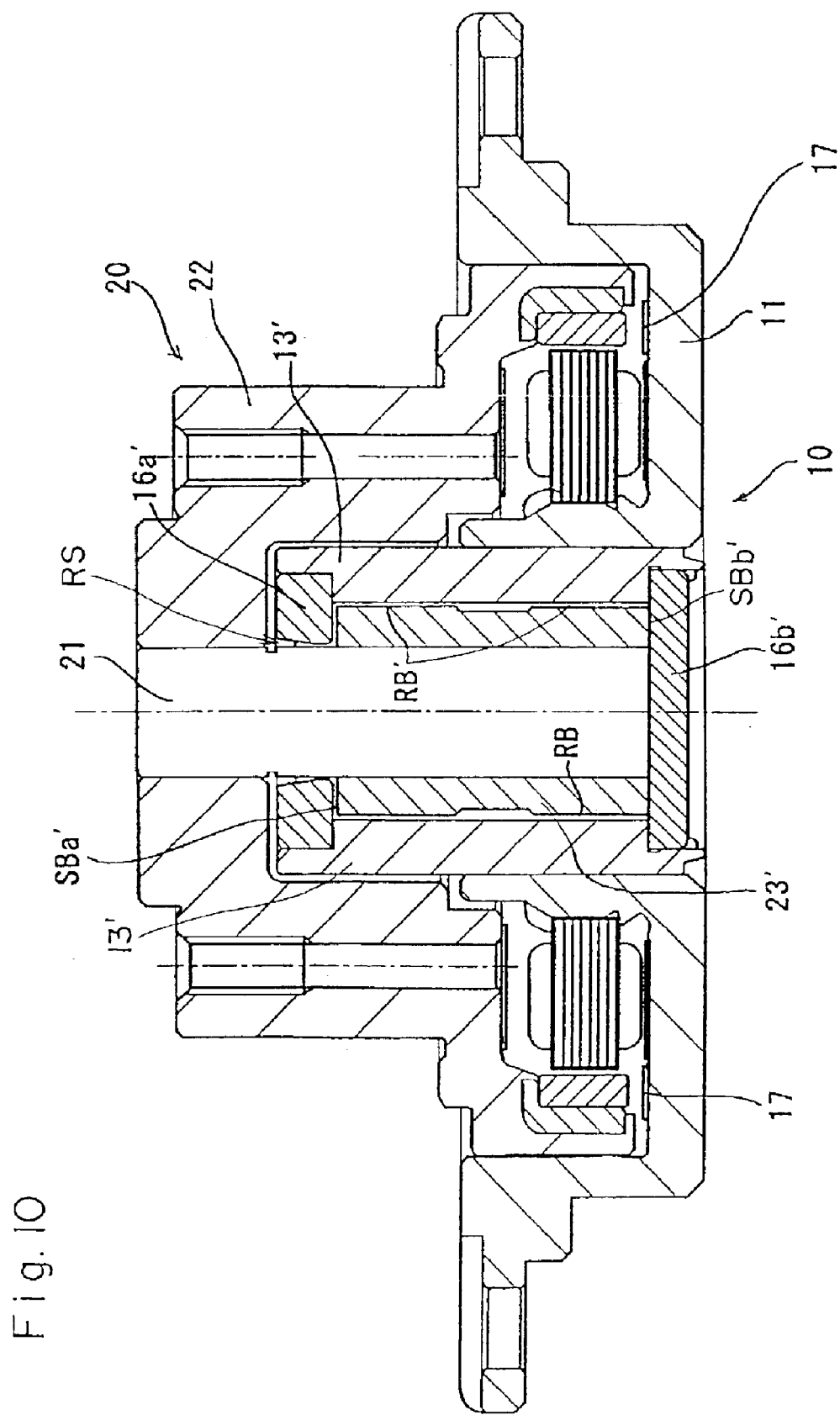
FIG. 10 is a vertical cross-sectional explanatory view showing a structural example of an HDD motor including a dynamic pressure bearing apparatus according to another embodiment of the present invention.

FIG. 10 shows another embodiment. In this embodiment, the thrust plate is formed into a sleeve shape, and the radial dynamic pressure portion RB' and the thrust dynamic pressure portions Sba' and SBb' are constituted between the thrust plate 23', the bearing sleeve 13' and the counter plates 16a' an 16b'. It is to be noted that same reference numerals denote constituent parts equal to those in the apparatus shown in FIG. 1 and differently configured members are designated by the same reference numerals with "'" added at the end. That is, the thrust plate 23' in this embodiment shown in FIG. 10 is formed into a sleeve shape having a length opposed to the substantially entire area of the bearing surface (entire area excluding a part corresponding to the thrust floatation) of the bearing sleeve 13', and a pair of the radial dynamic pressure bearing portions RB' and RB' distanced apart in the axial direction and the fluid tank portion S are provided on its outer peripheral surface. Furthermore, the thrust dynamic pressure portions SBa' and SBb' are formed between both end surfaces of the bearing sleeve 13' and the upper and lower counter plates 16a' and 16b' opposed to the end surfaces respectively. The dynamic pressure generating grooves are formed on a surface of any one of the thrust plate 23' or the bearing sleeve 13' or the counter plates 16a' and 16' in each dynamic pressure portion radial dynamic pressure portion RB' and the thrust dynamic pressure portions Sba' and SB$b'$.

Figure 11:
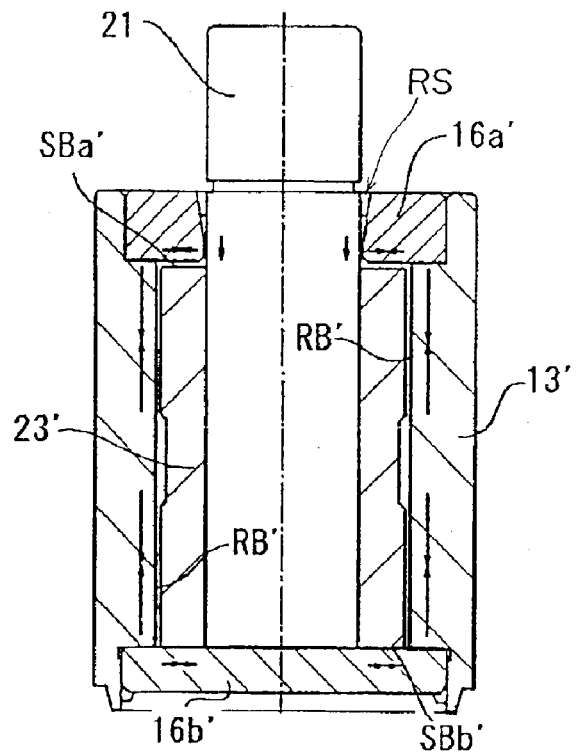
FIG. 11 is a partial vertical cross-sectional explanatory view showing a structural example for obtaining an unbalanced dynamic pressure pumping action in the dynamic pressure bearing apparatus of FIG. 10.
Figure 12:
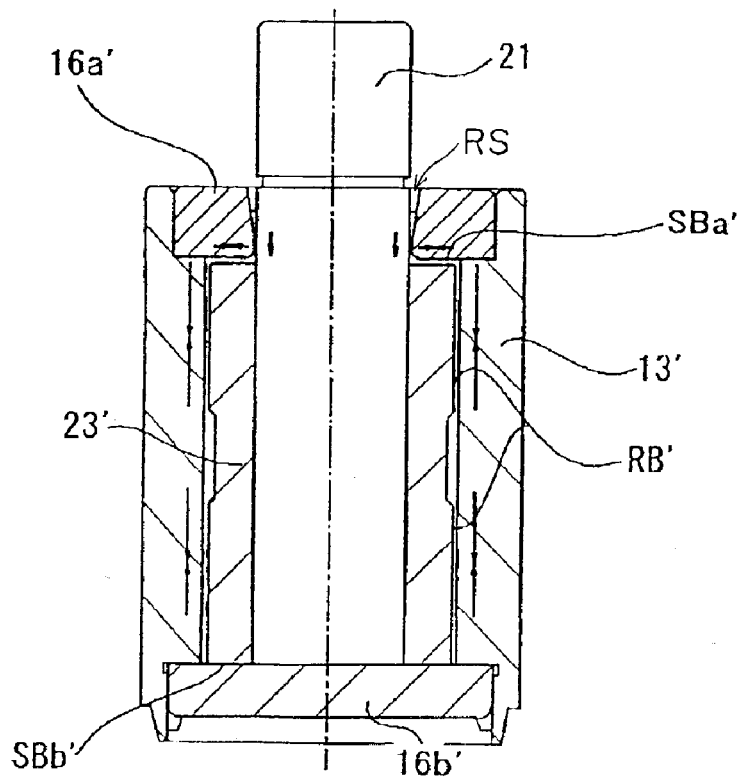
FIG. 12 is a partial vertical cross-sectional explanatory view showing another structural example for obtaining the unbalanced dynamic pressure pumping action in the dynamic pressure bearing apparatus of FIG. 10.
Figure 13:
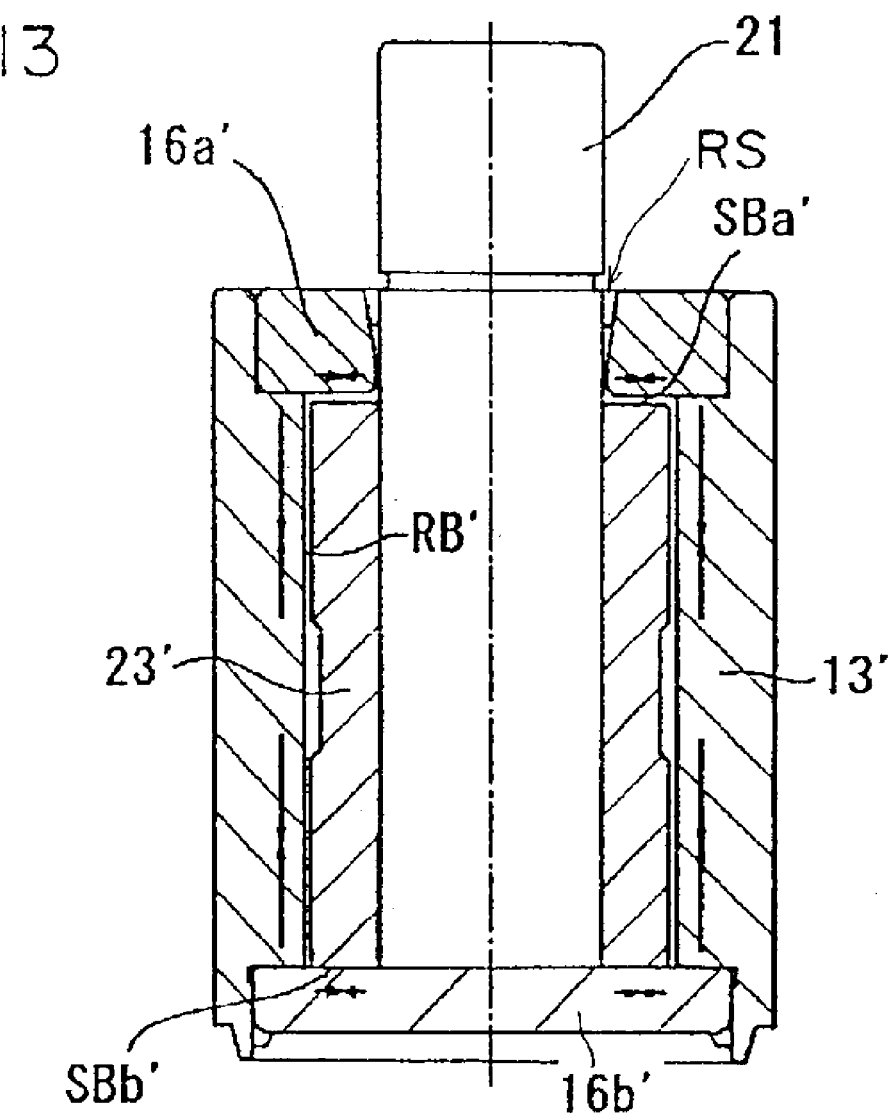
FIG. 13 is a partial vertical cross-sectional explanatory view showing still another structural example for obtaining the unbalanced dynamic pressure pumping action in the dynamic pressure bearing apparatus of FIG. 10.

This embodiment likewise includes fluid pressure applying means which gives the lubricating fluid 5 the inward pressure application force which is directed from the opened side to the closed side of the bearing gap. For example, as shown in FIG. 11, dynamic pressure grooves which generate a dynamic pressure having an inward vector component may be provided at a part where the upper counter plate 16a' and the rotatable shaft 21 are opposed to each other at a position, where the function of the seal portion RS is not substantially adversely affected, directly below the seal portion RS, or as shown in FIG. 12, thrust dynamic pressure generating grooves formed on at least one of the opposed surfaces of the upper counter plate 16a' and the bearing sleeve 13' may have a shape which generates an unbalanced dynamic pressure. Moreover, as shown in FIG. 13, the dynamic pressure generating grooves of the radial dynamic pressure bearing portion RB' provided on the outer peripheral surface of the thrust plate 23' close to the opened side (upper side in the drawing) may have a shape which generates an unbalanced dynamic pressure.

Figure 14:
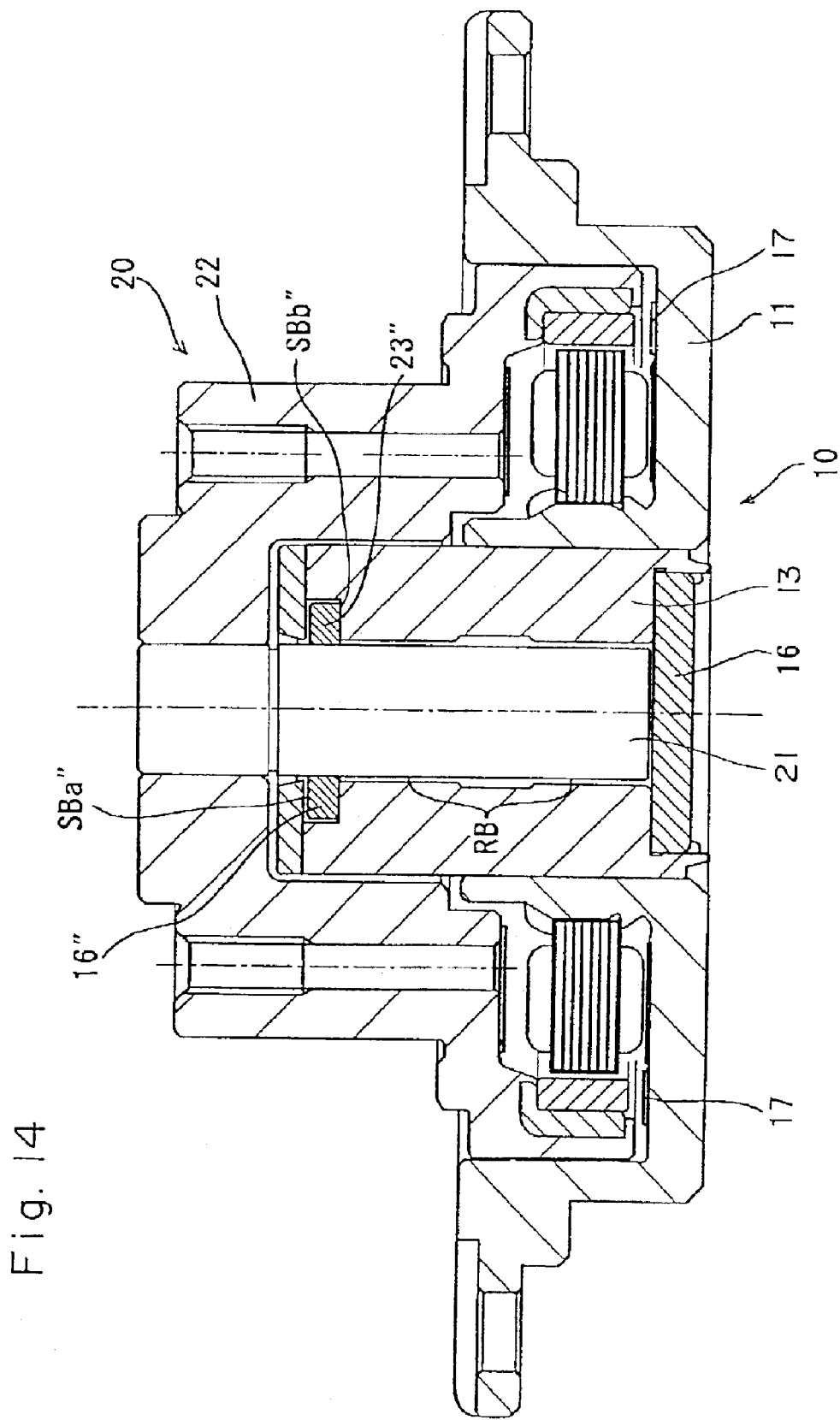
FIG. 14 is a vertical cross-sectional explanatory view showing a structural example of an HDD motor including a dynamic pressure bearing apparatus according to yet another embodiment of the present invention.

In addition, FIG. 14 shows still another embodiment. In this embodiment, the thrust plate is arranged to the outer side of the bearing sleeve (opened side which is the upper side in FIG. 14). It is to be noted that, in FIG. 14, the same reference numerals denote constituent parts equal to those in the apparatus shown in FIG. 1 and differently configured members are designated by the same reference numerals with "''" added at the end thereof. That is, the thrust plate 23'' in this embodiment illustrated in FIG. 14 is fixed to the upper side in the axial direction of the rotatable shaft 21, and the lower thrust dynamic pressure bearing portion SBb'' is formed in the bearing gap between the thrust plate 23'' and the bearing sleeve 13. Additionally, the upper thrust dynamic pressure bearing portion Sba'' is formed in the bearing gap between the upper counter plate 16'' attached on the opened end side (upper end side in the drawing) of the bearing sleeve 13 and the thrust plate 23''.

Figure 15:
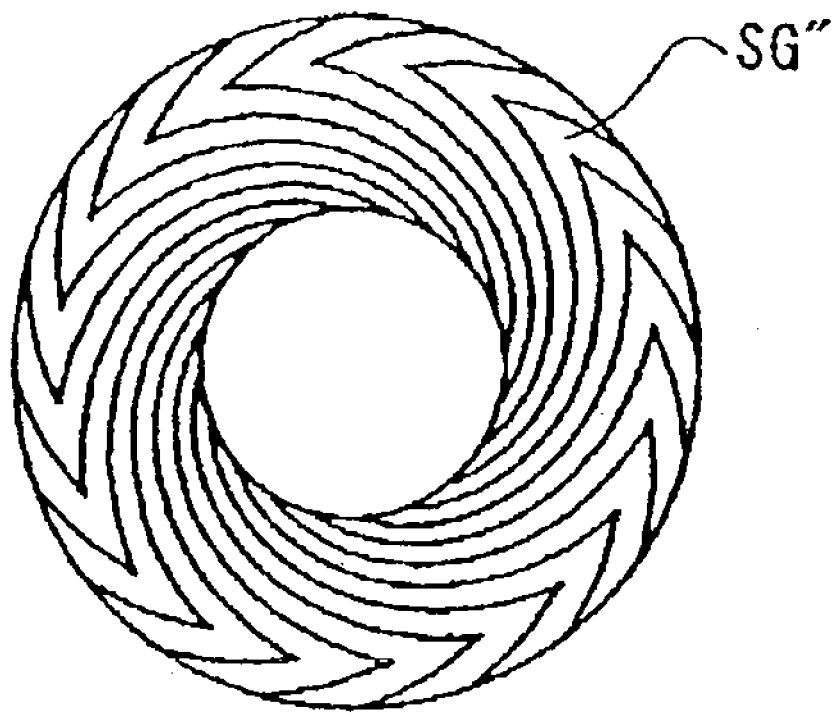
FIG. 15 is a plan explanatory view showing a structural example for obtaining an unbalanced dynamic pressure pumping action in the dynamic pressure bearing apparatus of FIG. 10.
Figure 16:
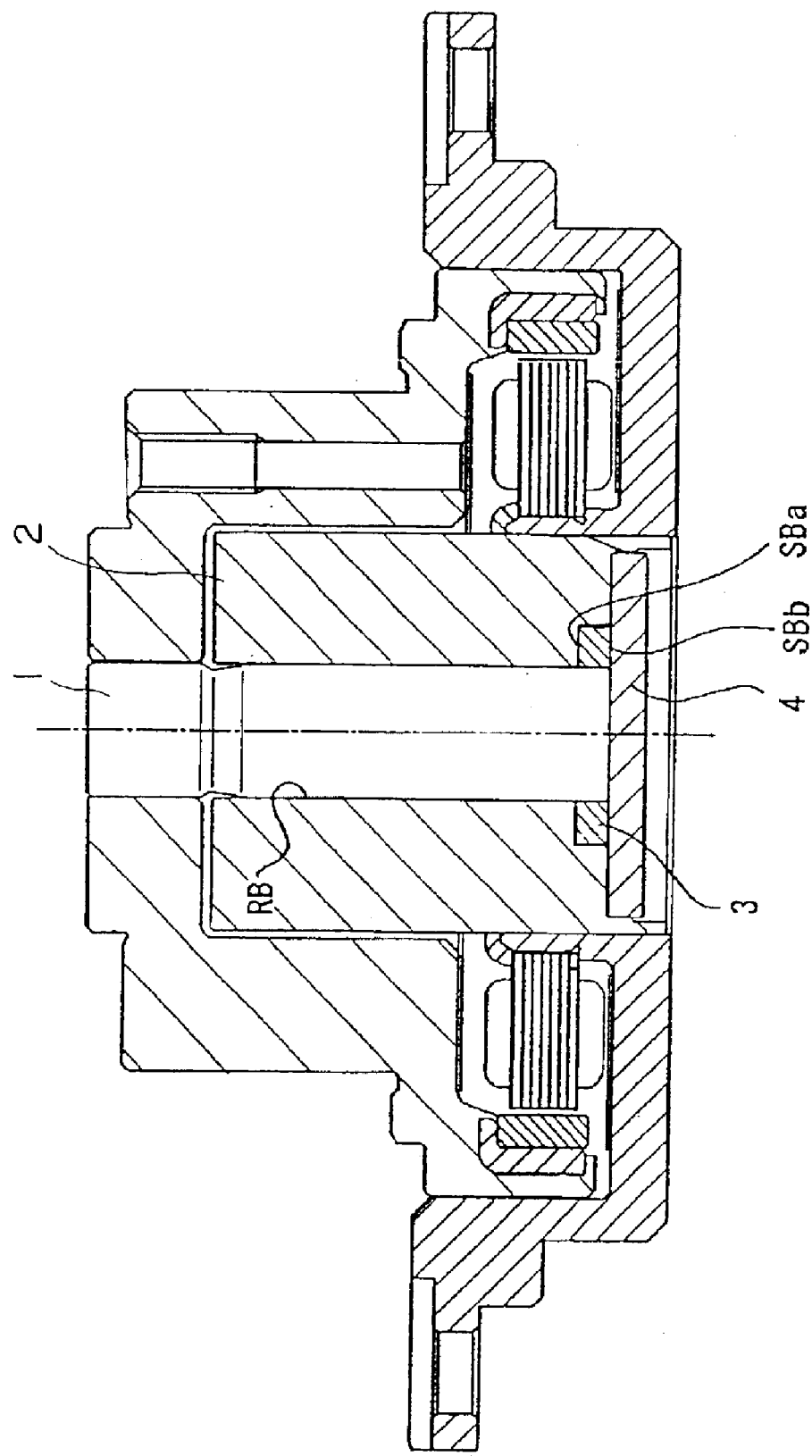
FIG. 16 is a vertical cross-sectional explanatory view showing a structural example of an HDD motor including a general dynamic pressure bearing apparatus.

In this embodiment, it is likewise preferable to provide fluid pressure applying means which gives the lubricating fluid 5 the inward pressure application force at a position close to the seal portion RS. For example, it is good enough that the thrust dynamic pressure generating grooves SG'' having a shape which generates the unbalanced dynamic pressure that the dynamic pressure having an inward (directed from the opened side toward the closed side of the bearing gap) vector component and the dynamic pressure having an outward (directed from the closed side toward the opened side of the bearing gap) vector component are simultaneously generated to the lubricating fluid 5 and the dynamic pressure having the inward vector component surpasses, which is shown in FIG. 15 for example, is provided on at least one side of the thrust dynamic pressure bearing portions Sba'' and SBb'', or more preferably on the thrust dynamic pressure bearing portion Sba'' side close to the outer side which is arranged so as to be close to the seal portion RS.

It is to be noted that the foregoing embodiments are the preferred embodiments according to the present invention but the present invention is not restricted thereto and various modifications can be carried out without departing from the scope of the invention. For example, the present invention can be similarly applied to a dynamic pressure bearing apparatus or the like used in a rotor other than the above-described HDD motor, e.g., a motor used to rotate a polygon mirror. Further, although description has been mainly given as to the case where the seal portion RS is provided by forming the tapered surface on the bearing sleeve 13, 13' or the radial dynamic pressure generating grooves 13a and 13b are formed in this embodiment, the present invention is not restricted thereto, and a surface which forms the seal portion RS and is tapered or the radial dynamic pressure generating grooves may be provided on the shaft member 21.

What is claimed is:

1. A dynamic pressure bearing apparatus comprising: a shaft member; a thrust plate having a larger diameter than the shaft member and being integrated with the shaft member; a bearing member surrounding the shaft member and the thrust plate from a radial direction and an axial direction respectively; and a radial dynamic pressure bearing portion and a thrust dynamic pressure bearing portion generating a dynamic pressure to a lubricating fluid filled in a bearing gap between the shaft member and the thrust plate, and the bearing member, the radial dynamic pressure bearing portion and the thrust dynamic pressure bearing portion being formed so as to be separated from each other, wherein one end side of the bearing gap in the axial direction is closed while the other end side is opened, a capillary seal portion on the opened side at the other end of the bearing gap, the capillary seal portion is formed in such a manner that an angle formed by opposed surfaces of the shaft member and the bearing member is large on a boundary with the bearing gap and continuously or discontinuously smaller as distanced from the boundary, the lubricating fluid is continuously filled in the entire bearing gap from the capillary seal portion so that a gas-liquid interface of the lubricating fluid is at a position where the angle is small in the capillary seal portion before the shaft member and the thrust plate relatively float, the apparatus includes fluid pressure applying means for giving the lubricating fluid an inward pressure application force directed from the opened side toward the closed side of the bearing gap, a quantity of the lubricating fluid to be filled is set to a quantity that the lubricating fluid fills the fluid pressure applying means even if the gas-liquid interface moves to the bearing gap side, which is generated when the shaft member and the thrust plate relatively float in the thrust direction.

2. The dynamic pressure bearing apparatus according to claim 1, wherein the fluid pressure applying means is constituted by forming dynamic pressure grooves of the outer radial dynamic pressure bearing portion close to the capillary seal portion side as dynamic pressure generating grooves having a shape which generates an unbalanced dynamic pressure that a dynamic pressure having an inward vector component and a dynamic pressure having an outward vector component are simultaneously generated and the dynamic pressure having the inward vector component surpasses.

3. The dynamic pressure bearing apparatus according to claim 1, wherein the fluid pressure applying means is constituted by forming dynamic pressure grooves of the outer thrust dynamic pressure bearing portion arranged so as to be close to the capillary seal portion as dynamic pressure generating grooves having a shape which generates an unbalanced dynamic pressure that a dynamic pressure having an inward vector component and a dynamic pressure having an outward vector component are simultaneously generated and the dynamic pressure having the inward vector component surpasses.

4. The dynamic pressure bearing apparatus according to claim 1, wherein the fluid pressure applying means consists of dynamic pressure grooves which generate a dynamic pressure having an inward vector component and is provided at a position immediately below the capillary seal portion where a function of the capillary seal portion is not substantially adversely affected.

5. The dynamic pressure bearing apparatus according to claim 1, wherein the apparatus includes magnetic sucking means which generates a suction force corresponding to a floatation force generated in the thrust bearing portion based on provision of the inward pressure application force.

6. The dynamic pressure bearing apparatus according to claim 5, wherein the dynamic pressure hearing apparatus is used for a motor having a rotor portion with a rotor magnet and a stator portion with a stator core, and a magnetic suction member which generates a suction force corresponding to a floatation force of the thrust bearing portion is provided at a position opposed to the rotor magnet.

7. The dynamic pressure bearing apparatus according to claim 6, wherein the magnetic suction member is constituted so as to generate a suction force larger than a weight of a rotatable member.

8. The dynamic pressure bearing apparatus according to claim 6, wherein the magnetic suction member consists of silicon steel or permalloy.

9. The dynamic pressure bearing apparatus according to claim 1, wherein the capillary seal portion is defined in an enlarge hole portion between the shaft member and an inner surface of the bearing member which accommodates the shaft member, and the large part and the small part of the angle formed by the opposed surfaces of the shaft member and the bearing member are defined by a cross-sectional outline having a polygonal line figure along an axial plane of the inner surface.

10. The dynamic pressure bearing apparatus according to claim 1, wherein the capillary seal portion is defined in an enlarge hole portion between the shaft member and an inner surface of the bearing member which accommodates the shaft member, and the large part and the small part of the angle formed by the opposed surfaces of the shaft member and the bearing member are defined by a cross-sectional outline having a continuously curved line figure along an axial plane of the inner surface.

11. The dynamic pressure bearing apparatus according to claim 1, wherein assuming that f is a capacity which can maintain the lubricating fluid in the capillary seal portion, r is a radius of the shaft member and f is a floatation quantity when the thrust plate relatively floats, a following conditional expression is satisfied:

$$L > \pi r^7 \times f.$$

12. The dynamic pressuring bearing apparatus according to claim 11, wherein the capacity L which can maintain the lubricating fluid in the capillary seal portion is a capacity constituted between a minimum gap quantity and a maximum gap quantity in the capillary seal portion obtained by gradually increasing toward the outside of the bearing a gap quantity between the shaft member and the bearing member constituting the radial dynamic pressure bearing portion.

* * * * *